Oct. 22, 1935.   C. A. JOHNSON   2,017,903
ARTIFICIAL FISHING BAIT
Filed Jan. 31, 1935   2 Sheets-Sheet 1
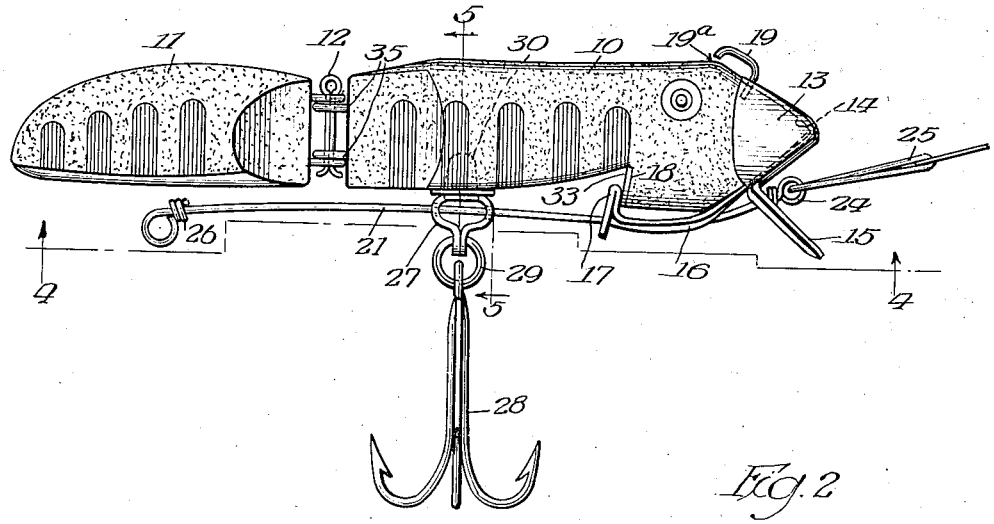
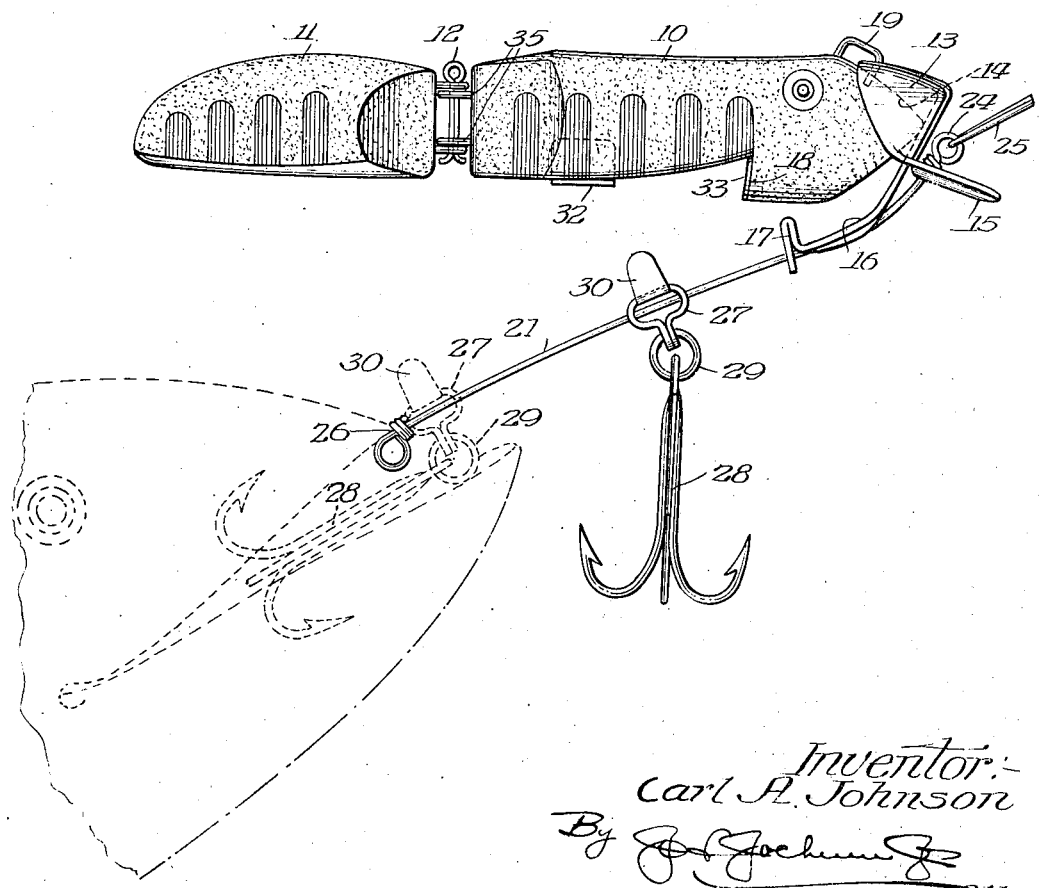
Inventor:-
Carl A. Johnson
By [signature]
Atty Oct. 22, 1935.  C. A. JOHNSON  2,017,903
ARTIFICIAL FISHING BAIT
Filed Jan. 31, 1935   2 Sheets-Sheet 2
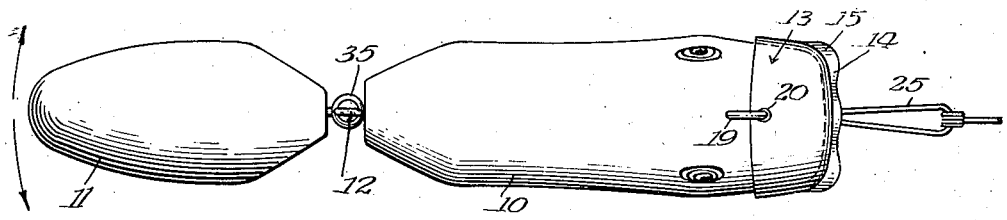
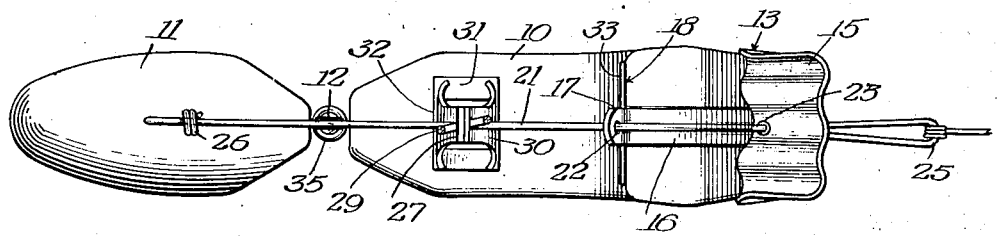
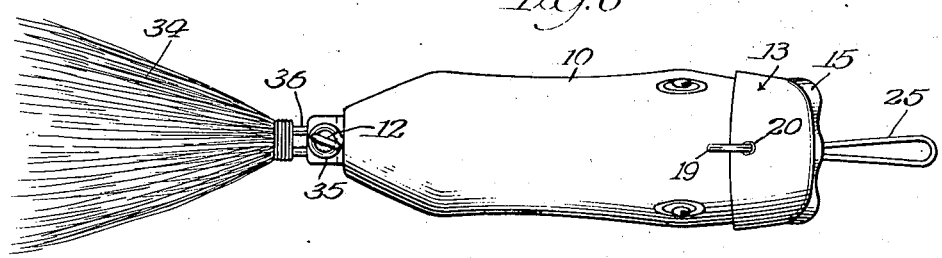
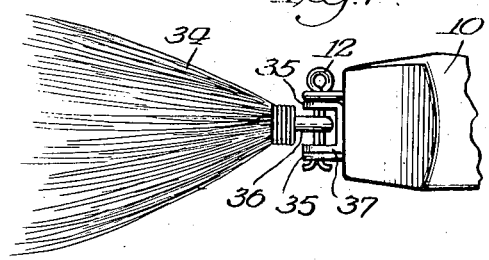
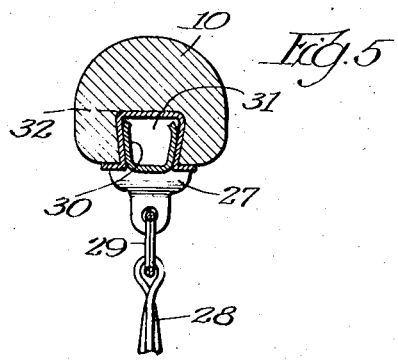
Inventor
Carl A. Johnson Patented Oct. 22, 1935

2,017,903

UNITED STATES PATENT OFFICE 2,017,903

ARTIFICIAL FISHING BAIT

Carl A. Johnson, Chicago, Ill.

Application January 31, 1935, Serial No. 4,294

16 Claims. (Cl. 43—46)

This invention relates to improvements in artificial fishing bait or lure, and one of the objects of the invention is to provide an improved device of this character comprising a body portion fashioned into any desired shape and in which there is provided a fish hook connected to the body and detachable therefrom under strain, such as when struck by a fish, the hook being also connected to a slide movable along a guide with respect to said body when detached from the body, the guide being provided with a shoulder or stop adapted to be impacted by the slide and thereby suddenly arrested or interrupted in its sliding movement with respect to the guide, so as to cause the hook to be embedded in the mouth of the fish.

A further object is to provide improved means for detachably securing the hook and slide to the body portion of the bait, and improved means for maintaining the hook against sliding movement longitudinally of the body until the hook is struck by a fish.

A further object is to provide an improved bait of this character, the body portion of which is formed of sections joined together, and improved means whereby one of the sections may be detached and interchanged with another section to alter the shape or change the nature of the bait according to the kind of fish to be caught.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a side elevation of a bait of this character constructed in accordance with the principles of this invention and showing the hook detachably secured to the body.

Figure 2 is a view similar to Figure 1, showing the position the parts will assume when the hook is struck by a fish.

Figure 3 is a top plan view of Figure 1.

Figure 4 is a view taken on line 4—4, Figure 1, from the bottom of the body.

Figure 5 is a detail sectional view taken on line 5—5, Figure 1.

Figure 6 is a view similar to Figure 3 with one of the sections of the body interchanged for another section.

Figure 7 is a side elevation of the rear portion of Figure 6.

Referring more particularly to the drawings, the body of the bait consists essentially of two sections 10 and 11 detachably secured together for pivotal movement one with relation to the other by means of a removable pintle 12.

The body thus formed may be constructed of any suitable material and may be of any desired size and configuration, suffice it to say that the body will be buoyant.

The numeral 13 designates a cap or hood constructed of any suitable material adapted to be placed over one end of the body, the portion 14 of the body being shaped to receive the hood.

The hood is provided with a depending portion 15 arranged at any desired angle of inclination with respect to the hood, and this portion 15 is preferably corrugated, as shown more clearly in Figure 4 and is of a suitable size to constitute and form a reflector, and will also act as a "wobbler".

Secured to and projecting rearwardly from the hood is an arm or extension 16 formed of any suitable material, a portion of which is shaped to form a shoulder 17 adapted to engage behind a shoulder 18 on the body of the bait, preferably the bottom thereof so as to detachably secure the hood 13 in position.

A securing means 19, preferably in the form of a hook or staple, is connected to the body and passes through a suitable opening 20 in the hood so as to connect the body and hood together in such a manner that although the hood may be removed or detached from the end 14 of the body, the body will remain pivotally connected to the hood so as not to float away from the hood.

The numeral 21 designates a spring bar or rod constituting and forming a guide. This guide 21 preferably passes through an opening 22 in the end of the arm or extension 16 and also through an opening 23 in the reflector 15, being secured to these parts in any suitable manner and against relative movement with respect thereto. One end of the guide 21 adjacent the reflector 15 is shaped to form an eye 24, by means of which it may be connected to a line 25.

The guide 21 extends for a substantial distance lengthwise of the body and of the sections 10 and 11, and is arranged below and spaced from the body, the free end of the guide being shaped to form a shoulder or stop 26. This is preferably accomplished by forming the end of the guide into an eye or loop and coiling the extremity of the guide about itself.

The guide or bar 21 is of a somewhat resilient nature and movable thereupon is a slide 27, to which slide a fish hook 28 is connected by means of a link or ring 29, whereby the hook will have a pivotal movement with respect to the slide.

The slide is provided with projecting spring ears or lugs 30 adapted to be seated in a recess 31 in the body of the bait. If desired, the recess 31 may be provided with a lining of suitable material 32, so as to prevent wear of the parts.

If desired, a wear plate 33 may be provided on the face of the shoulder 18 and with which the shoulder 17 contacts.

In use, the hood 13 is first placed over the end 14 of the body and the shoulder 17 is engaged behind the shoulder 18. The slide 27 is then detachably secured to the body by inserting the spring ears or lugs 30 into the recess 31. This will place the guide 21 under lateral tension, and the guide is of such length and the shoulders 17 and 26 are so disposed with respect to each other that the slide 27, when detached from the body, will be adapted for movement for a considerable distance along the guide 21.

When the hook 28 is detachably secured to the body, and the fish makes a strike, as shown more clearly in Figure 2, the slide 27 will first be detached from the body and the hood 14 will move into the position as shown in Figure 2. The fish then draws the slide 27 along the guide 21 with considerable rapidity, but when the slide 27 impacts or strikes the shoulder 26, the movement of the hook 28 and the slide 27 along the guide 21 will be suddenly interrupted, thereby causing the hook to be embedded in the mouth of the fish.

By reason of the pivotal connection between the hood 13 and the body through the medium of the element 19, it will be manifest that when the guide 21 is detached from the body, the guide will remain attached to the line 25 and the body portion 10—11 will be prevented from floating away by reason of this connection 19, yet it will not be in the way and will not interfere with the landing of the fish.

The interengaging shoulders 17 and 18 respectively on the guide 21 and body section 10, provide a means for preventing the slide 21 from being moved longitudinally of the body when the hook is detachably connected to the body, and also serves as a means for preventing the detachment of the hood and guide 21 from the body under normal conditions, but will yield when the fish strikes the hook, to permit the slide 27 to travel along the guide 21.

If it is desired that the hood 13 together with the parts carried thereby shall become entirely detached from the body 10 when a fish makes a strike, the fastening device 19 may be bent or so shaped as to form an opening 19ª (see Figure 1) between the extremity of the device 19 and the body portion so that the edge of the hood 13 may pass therethrough.

If desired, and in order to change the nature or character of the bait, the body section 11 may be detached from the section 10, and in lieu thereof, a feather or hair section 34 may be interchanged therewith. This is accomplished by removing the pintle 12, allowing the eyes 35 to remain on the body section 10. The section 34 is provided with an eye or loop 36 and a bifurcated member 37, which latter is adapted to be inserted between the eyes 35 with the eye 36 of the member 34 standing within the bifurcation of the member 37, after which the pintle pin 12 may be inserted to pivotally lock all of these parts together.

With this improved construction it will be manifest that a very effective artificial bait will be provided and the hook 28 will be maintained detachably connected to the body until a strike is made, after which and by reason of the sudden stopping of the slide 27 and hook 28 along the guide 21, by the impact of the slide with the shoulder 26, the hook will be firmly embedded in the mouth of the fish and the fish will not be lost.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. An artificial bait including a body of substantial length, a flexible guide secured by one end to the body and extending lengthwise of the body for a substantial distance and spaced therefrom, a stop on the guide, a hook slidable upon the guide and adapted to impact said stop, and means for securing the hook to said body, the said hook being detachable from the body under strain.

2. An artificial bait including a body of substantial length, a flexible guide secured by one end to the body and extending lengthwise of the body for a substantial distance and spaced therefrom, a stop on the guide, a hook slidable upon the guide and adapted to impact said stop, and means for securing the hook to said body and for placing said guide under tension, the said hook being detachable from the body under strain.

3. An artificial bait including a body of substantial length, a flexible guide secured by one end to the body and extending lengthwise of the body for a substantial distance and spaced therefrom, a stop on the guide, a hook slidable upon the guide and adapted to impact said stop, means for securing the hook to said body, the said hook being detachable from the body under strain, and means for attaching the guide to a line.

4. An artificial bait including a body of substantial length, a flexible guide, means detachably securing one end of the guide to the body, said guide extending lengthwise of the body for a substantial distance and spaced therefrom, a stop on the guide, a hook slidable upon the guide and adapted to impact said stop, means for securing the hook to the body, said hook being detachable from the body under strain, and means for attaching the said guide to a line.

5. An artificial bait including a body of substantial length, a flexible guide, means detachably securing one end of the guide to the body, said guide extending lengthwise of the body for a substantial distance and spaced therefrom, a stop on the guide, a hook slidable upon the guide and adapted to impact said stop, means for securing the hook to the body, said hook being detachable from the body under strain, means for attaching the said guide to a line, and means for maintaining said guide against longitudinal movement with respect to said body, when the hook is secured to the body.

6. An artificial bait including a body of substantial length, a flexible guide secured by one end to the body and extending lengthwise of the body for a substantial distance and spaced therefrom, a stop on the guide, a hook slidable upon the guide and adapted to impact said stop, means for securing the hook to said body, the said hook being detachable from the body under strain, means for securing the guide to a line, and means for maintaining said guide against longitudinal movement with respect to the said body while the hook is attached to the body.

7. An artificial bait including a body of substantial length, a flexible guide secured by one end to the body and extending lengthwise of the body for a substantial distance and spaced therefrom, a stop on the guide, a hook slidable upon the guide and adapted to impact said stop, means for securing the hook to said body, the said hook being detachable from the body under strain, means for attaching the guide to a line, and interengaging shoulders on said body and the guide for maintaining the latter against longitudinal movement with respect to the body when the hook is detachably secured to the body.

8. An artificial bait including a body of substantial length, a flexible guide secured by one end to the body and extending lengthwise of the body for a substantial distance and spaced therefrom, a stop on the guide, a hook slidable upon the guide and adapted to impact said stop, means for securing the hook to said body, the said hook being detachable from the body under strain, and a reflector depending from one end of the body.

9. An artificial bait including a body of substantial length, a flexible guide secured by one end to the body and extending lengthwise of the body for a substantial distance and spaced therefrom, a stop on the guide, a hook slidable upon the guide and adapted to impact said stop, means for securing the hook to said body, the said hook being detachable from the body under strain, and a reflector depending from one end of the body and through which reflector the end of the said guide projects.

10. An artificial bait including a body of substantial length, a hood detachably engaging one end of the body, a flexible guide secured by one end to the hood to project lengthwise of the body for a substantial distance and spaced therefrom, a hook slidable upon the guide, a shoulder on the guide to be impacted by the hook by the movement of the hook upon the guide, means for detachably securing the hook to the body and for placing said guide under lateral tension, said hook being detachable from the body under strain, means for securing said guide to a line, and yieldable means for maintaining said hood against displacement and said guide against longitudinal movement with respect to said body.

11. An artificial bait including a body of substantial length, a hood detachably engaging one end of the body, a flexible guide secured by one end to the hood to project lengthwise of the body for a substantial distance and spaced therefrom, a hook slidable upon the guide, a shoulder on the guide to be impacted by the hook by the movement of the hook upon the guide, means for detachably securing the hook to the body and for placing said guide under lateral tension, said hook being detachable from the body under strain, means for securing said guide to a line, yieldable means for maintaining said hood against displacement and said guide against longitudinal movement with respect to said body, and means forming a swinging connection between said hood and said body for maintaining them against separation when the hood is removed from the end of the body.

12. An artificial bait including a body of substantial length, a hood detachably engaging one end of the body, a flexible guide secured by one end to the hood to project lengthwise of the body for a substantial distance and spaced therefrom, a hook slidable upon the guide, a shoulder on the guide to be impacted by the hook by the movement of the hook upon the guide, means for detachably securing the hook to the body and for placing said guide under lateral tension, said hook being detachable from the body under strain, means for securing said guide to a line, and yieldable means for maintaining said hood against displacement and said guide against longitudinal movement with respect to said body, the last recited means embodying interengaging shoulders on the body and guide.

13. An artificial bait embodying a body of substantial length, means for connecting a line thereto, a guide extending lengthwise of said body, a shoulder on the guide, a hook slidable upon the guide to impact said shoulder, and means securing the hook to said body, said hook being detachable from the body under strain.

14. An artificial bait embodying a body of substantial length, means for connecting a line thereto, a guide extending lengthwise of said body, a shoulder on the guide, a hook slidable upon the guide to impact said shoulder, and means securing the hook to said body, said hook being detachable from the body under strain, said hook remaining connected with the line through the medium of said guide, after it becomes detached from said body.

15. An artificial bait embodying a body, means for connecting a line thereto, a fish hook, fastening means between the hook and said body for maintaining them in fixed position with respect to each other, said hook being detachable from the body under strain, means adapting the hook for free bodily movement in directions lengthwise of and with respect to said body when detached from the body, and a stop for interrupting such free bodily movement of the hook at a predetermined point in such movement.

16. An artificial bait embodying a body, means for connecting a line thereto, a fish hook, fastening means between the hook and said body for maintaining them in fixed position with respect to each other, said hook being detachable from the body under strain, means adapting the hook for free bodily movement in directions lengthwise of and with respect to said body when detached from the body, and a stop for interrupting such free bodily movement of the hook at a predetermined point in such movement, a portion of the last said means also serving to maintain the hook connected with the line after the hook becomes detached from said body.

CARL A. JOHNSON.